United States Patent
Hays et al.

(10) Patent No.: US 8,099,678 B2
(45) Date of Patent: Jan. 17, 2012

(54) DYNAMIC DETERMINATION OF ACTIONS ON SELECTED ITEMS ON A REPORT

(75) Inventors: Christopher A. Hays, Redmond, WA (US); Jason D. Carlson, Redmond, WA (US); Robert A. Meyers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 11/411,642

(22) Filed: Apr. 26, 2006

(65) Prior Publication Data

US 2007/0256028 A1 Nov. 1, 2007

(51) Int. Cl.
*G06F 3/048* (2006.01)
(52) U.S. Cl. ...................................................... 715/825
(58) Field of Classification Search .................. 715/825; 707/3, 103 Y
See application file for complete search history.

(56) References Cited

U.S. PATENT DOCUMENTS

| | | | | |
|---|---|---|---|---|
| 6,246,999 | B1 * | 6/2001 | Riley et al. | 705/30 |
| 2002/0054169 | A1 * | 5/2002 | Richardson | 345/854 |
| 2003/0208460 | A1 * | 11/2003 | Srikant et al. | 707/1 |
| 2004/0034615 | A1 * | 2/2004 | Thomson et al. | 707/1 |
| 2004/0139102 | A1 * | 7/2004 | Vierich et al. | 707/102 |
| 2004/0267887 | A1 * | 12/2004 | Berger et al. | 709/206 |
| 2004/0268237 | A1 * | 12/2004 | Jones et al. | 715/513 |
| 2005/0034064 | A1 * | 2/2005 | Meyers et al. | 715/513 |
| 2005/0039033 | A1 * | 2/2005 | Meyers et al. | 713/193 |
| 2005/0267868 | A1 * | 12/2005 | Liebl et al. | 707/2 |
| 2005/0289470 | A1 * | 12/2005 | Pabla et al. | 715/751 |
| 2006/0026498 | A1 * | 2/2006 | Hays et al. | 715/503 |

* cited by examiner

*Primary Examiner* — Tuyetlien Tran

(57) ABSTRACT

Various technologies for processing a selection on an item on a report. In one implementation, a request to perform an action on the item may be received. Whether one or more actions corresponding to the item exist based on one or more parameters and one or more values of the parameters associated with the item may be dynamically determined. A list of one or more actions may be displayed if the one or more actions exist.

12 Claims, 2 Drawing Sheets

US 8,099,678 B2

DYNAMIC DETERMINATION OF ACTIONS ON SELECTED ITEMS ON A REPORT

BACKGROUND

In any enterprise, data regarding aspects thereof may be accumulated over time. Such data may be used to report the status of the enterprise. For example, with regard to a sales enterprise, sales data may be accumulated pertaining to each sale of a product, including the salesman, the customer, the region of the salesman, the region of the customer, the amount of the sale, the quantity of the product sold, the date of the sale, the date of the delivery of the sold product, and the like. Based on such sales data, a report may be generated that details sales by year, by month, by customer by year, by product by quarter, by salesman by delivery date, by region by week, and the like.

Some items on the report may be associated with one or more actions, which are executable upon selection of the associated items. Examples of such actions include launching a website, generating a drillthrough report and the like. The actions are typically predetermined by a report author at the time a report definition is made.

SUMMARY

Described herein are implementations of various technologies for processing a selection on an item on a report. In one implementation, a request to perform an action on the item may be received. Whether one or more actions corresponding to the item exist based on one or more parameters and one or more values of the parameters associated with the item may be dynamically determined. A list of one or more actions may be displayed if the one or more actions exist.

Described herein are also implementations of various technologies for processing a request to display one or more actions for a selected item on a report. In one implementation, one or more parameters associated with the item and one or more values of the parameters may be received. One or more actions that may be performed on the selected item may be determined. A list of the one or more actions may be sent to a report control.

Described herein are also implementations of various technologies for a memory for storing data for access by an application program being executed on a processor. The memory may include a data structure stored in the memory. The data structure may include a set of instructions for a report control. The set of instructions may be configured to cause the report control to send one or more parameters associated with an item on a report that has been selected to perform one or more actions.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

Implementations of various technologies described herein may be operational with numerous general purpose or special purpose computing system environments or configurations. Examples of well known computing systems, environments, and/or configurations that may be suitable for use with various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various techniques and technologies described herein may be implemented in the general context of computer-executable instructions, such as program modules, being executed by a computer. Generally, program modules include routines, programs, objects, components, data structures, etc. that perform particular tasks or implement particular abstract data types. Implementations of various technologies described herein may also be practiced in distributed computing environments where tasks are performed by remote processing devices that are linked through a communications network. In a distributed computing environment, program modules may be located in both local and remote computer storage media including memory storage devices.

Figure 1:
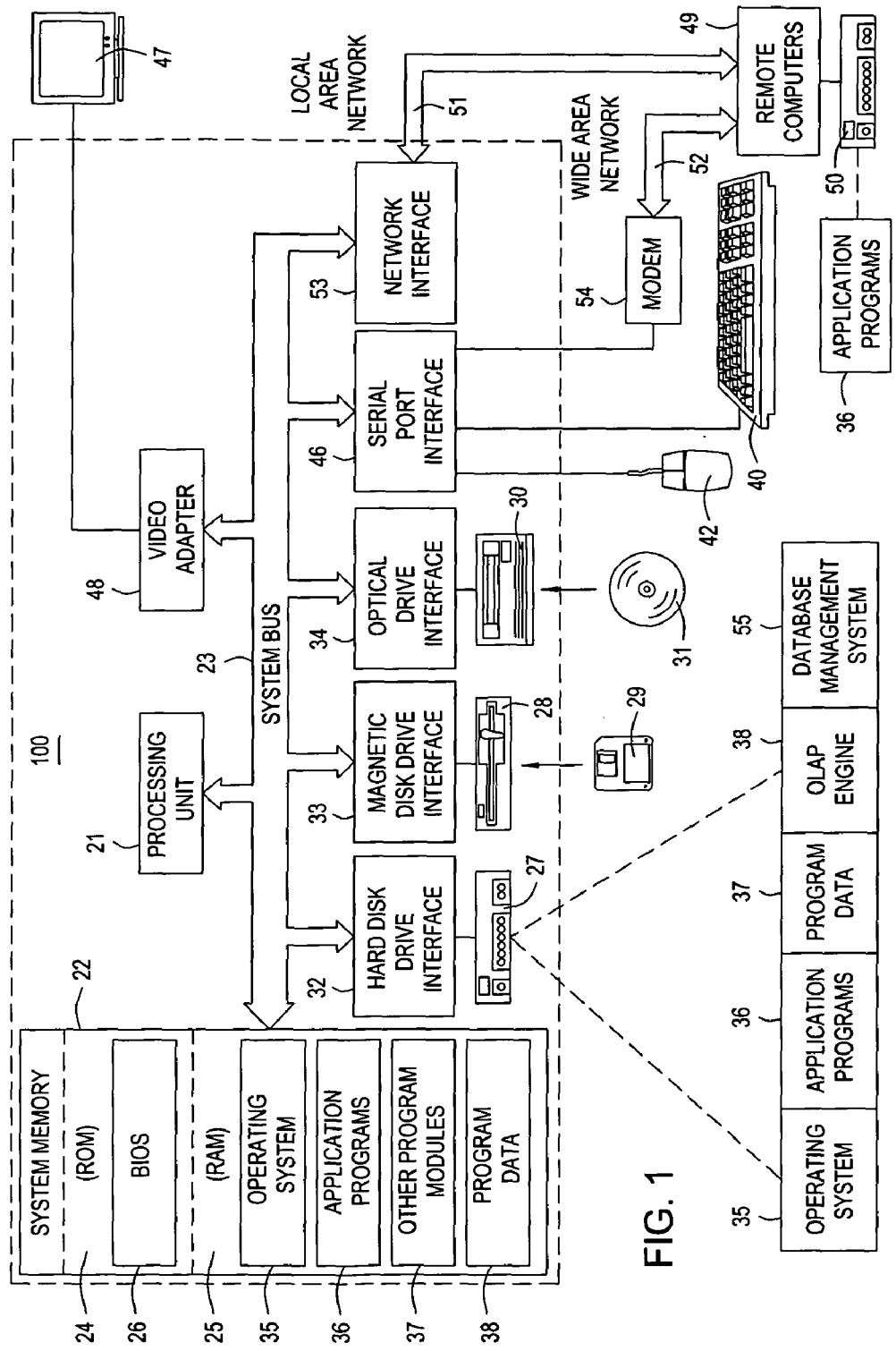
FIG. 1 illustrates a schematic diagram of a computing system in which various technologies described herein may be incorporated and practiced.

FIG. 1 illustrates a schematic diagram of a computing system 100 in which various technologies described herein may be incorporated and practiced. The computing system 100 may be a conventional desktop or a server computer. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like. Some implementations may be practiced in distributed computing environments where tasks are performed by local and remote processing devices that are linked through a communications network, e.g., by hardwired links, wireless links, or combinations thereof. In a distributed computing environment, program modules may be located in both local and remote memory storage devices.

Referring back to FIG. 1, the computing system 100 may include a central processing unit (CPU) 21, a system memory 22 and a system bus 23 that couples various system components including the system memory 22 to the CPU 21. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24. Although only one CPU is illustrated in FIG.

1, it should be understood that in some implementations the computing system 100 may include more than one CPU.

The computing system 100 may further include a hard disk drive 27 for reading from and writing to a hard disk, a magnetic disk drive 28 for reading from or writing to a removable magnetic disk 29 and an optical disk drive 30 for reading from or writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100. Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

A number of program modules may be stored on the hard disk, magnetic disk 29, optical disk 31, ROM 24 or RAM 25, including an operating system 35, one or more application programs 36, other program modules 37, a program data 38 and a database system 55. The operating system 35 may be any suitable operating system that may control the operation of a networked personal or server computer, such as Windows® XP, Mac OS® X, Unix-variants (e.g., Linux® and BSD®), and the like.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices, such as speakers and printers.

The computing system 100 may operate in a networked environment using logical connections to one or more remote computers, such as a remote computer 49. The remote computer 49 may be another personal computer, a server, a router, a network PC, a peer device or other common network node, and may include many or all of the elements described above relative to the computing system 100, although the remote computer 49 is illustrated as having only a memory storage device 50. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54 or other means for establishing communication over wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware or software or, where appropriate, with a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an API, reusable controls, and the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Implementations of various technologies described herein may be implemented in connection with any computing environment, such as a network or distributed computing environment. Still further, various technologies described herein may be implemented in or across a plurality of processing chips or devices, and storage may similarly be effected across a plurality of devices. Such devices may include personal computers, network servers, handheld devices, supercomputers, or computers integrated into other systems such as automobiles and airplanes.

Figure 2:
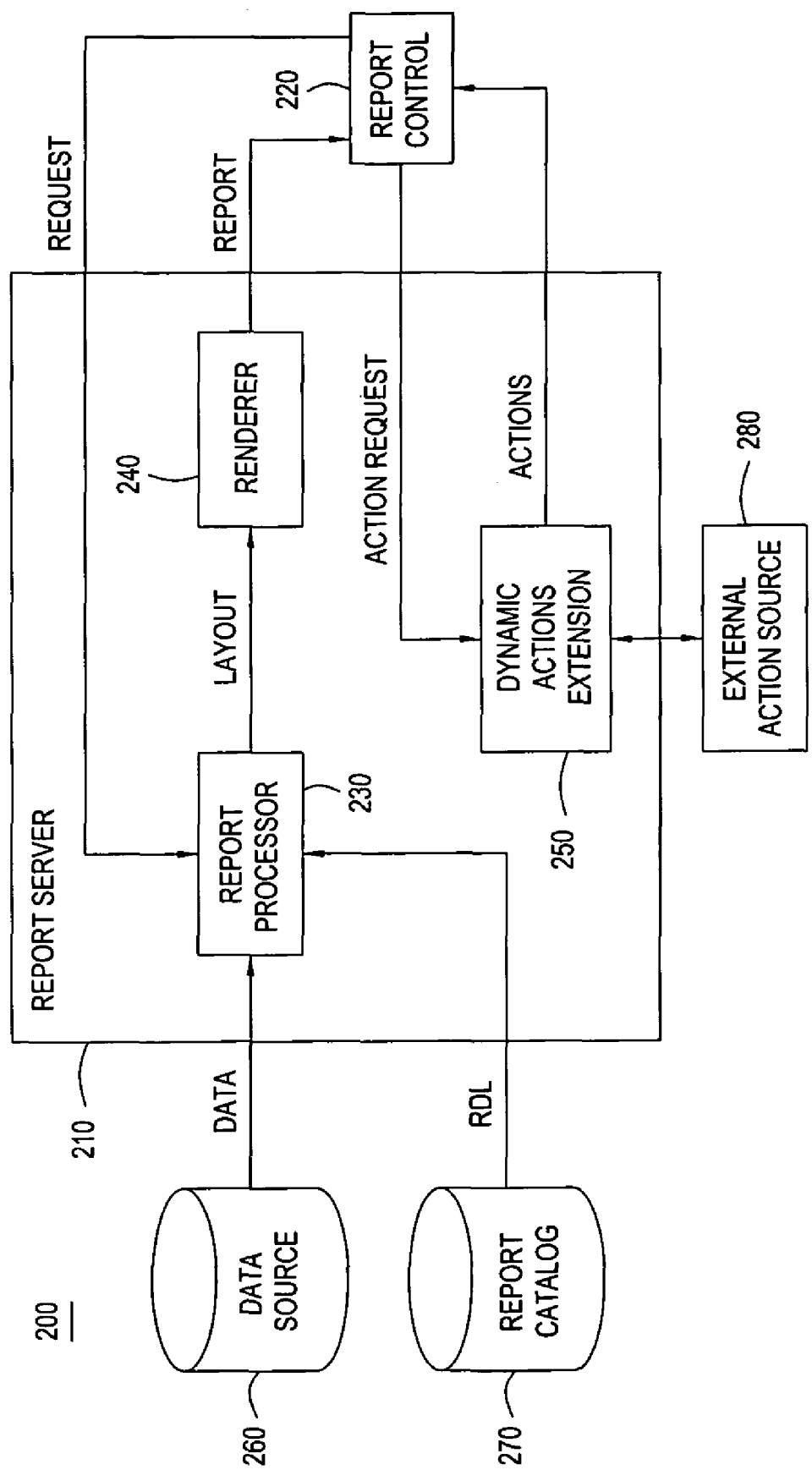
FIG. 2 illustrates various components inside a computing environment that may be used to generate a report and process one or more actionable items on the report in accordance with implementations of various technologies described herein.

FIG. 2 illustrates various components inside a computing environment 200 that may be used to generate a report and process one or more actionable items on the report in accordance with implementations of various technologies described herein. A report is typically a compilation of data for display in columns and rows on a visual surface. Reports may also include charts, which graphically present data without columns and rows, as in the familiar pie chart. The data in a report can be any data. A typical report may include financial data for an enterprise, such as gross revenue for the sales of various products, expenses associated with various products, profits associated with various products, and the like. Other reports may include customer information, such as names, contact information including telephone numbers, addresses, and email addresses, as well as product preferences, gross annual purchases, special discounts, and the like. A report may also be used to track employees, by compiling employee names, hours worked, accomplishments, scheduled vacation time, special needs, and the like. These examples are a very small subset of the possible data that may be included in a report. Any data that humans may desire to compile regarding any endeavor can be placed in a report.

In one implementation, the computing environment 200 may include a report server 210 in communication with a report control 220. The report server 210 may include a report processor 230, a renderer 240 and a dynamic actions extension 250. The report processor 230 may be in communication with a data source 260 and a report catalog 270. The dynamic actions extension 250 may be in communication with an external action source 280. The dynamic actions extension 250 may be configured to provide a call back ability for the report control 220 to communicate back to the report server 210 at runtime to request the current set of actions that may be performed on items having the call back ability. Although only one dynamic actions extension 250 is illustrated in FIG. 2, it should be understood that more than one dynamic actions extension may be used in various implementations described herein.

In one implementation, the report server 210, the data source 260 and the report catalog 270 may reside on the main server of the computing environment 200, while the report control 220 may reside on a user machine. However, it should be understood that in some implementations, the report server 210, the report control 220, the data source 260 and the report catalog 270 may be distributed in other ways, such as, they all may reside on a single machine. In another implementation, the external action source 280 may reside in a server different from the main server in which the report server 210 may reside.

In operation, the report control 220 may initiate the report generation process by sending a request to the report processor 230 for a report to be generated. In response, the report processor 230 may fetch the definition for the report from the report catalog 270.

A report definition is a template for a report that defines what data will be displayed in the report and the format of the data. A report definition may include a computer readable set of instructions in a proper computer readable syntax, such as XML or HTML. Such a definition may also be embodied graphically. In the case of a graphically represented report definition, a report definition software may be used as an aid in supplying report definition parameters and generating a report definition file. The report definition may also be referred to as report definition language (RDL), which may include the query information, the layout information and the data source information.

A report definition, whether generated directly or with the aid of report definition software, may be used by the report processor 230 to generate the report. This process generally entails populating the appropriate columns and rows indicated in a report definition with appropriate data.

In response to receiving the report definition, the report processor 230 may determine from the data source information in the report definition each data source 260 from which a set of data may be obtained to generate the report. In addition, the report processor 230 may determine from the query information in the report definition each query that is to be submitted to obtain the set of data and the data source to which the query is submitted.

In response to receiving the queries from the report processor 230, the data source 260 sends the data sets to the report processor 230. Once all the data sets needed for the report have been received by the report processor 230, the report processor 230 may then compile the received data into a layout specified by the report definition. The layout may include internal structures that describe the contents of the report.

The report processor 230 may then forward the layout to the renderer 240. In response, the renderer 240 and the report control 220 may render the report according to a predetermined rendering format, such as an XML, bitmap, printer, TIFF, PostScript, PCL, PDF, JPEG and the like. In rendering the report, the renderer 240 may send a set of drawing instructions to the report control 220, which may then display the report on the screen. The rendering format and the set of drawing instructions may be part of the report definition. Alternatively, the rendering format may be provided to the report processor 230 when the report is run, after the layout has been compiled or at any other appropriate or necessary time.

In addition to the set of drawing instructions, a set of action instructions may also be part of the report definition. In one implementation, the set of action instructions is configured to dynamically determine the set of actions that may be performed by a selected item on the report. When such item is selected, the report control 220 sends one or more parameters associated with the item and the values of those parameters to the dynamic actions extension 250. In response to receiving the parameters and the values, the dynamic actions extension 250 makes a determination as to whether there are any actions that can be performed using the parameters. If there are actions that match the parameters, the dynamic actions extension 250 may return a set of actions that may be performed on that item to the report control 220. In one implementation, the set of possible actions may be determined based on semantic knowledge about reports in general. In another implementation, the set of possible actions may be determined based on semantic knowledge about the particular content of the report. Examples of such actions include hyperlink actions, drillthrough report actions, bookmark actions and the like. For example, if the parameter is CustomerEmail and the value is Joe, the actions returned may include a drillthrough report to customer Joe and a hyperlink to send an email to customer Joe. As another example, if the first parameter is CustomerEmail and the value for the first parameter is Joe and the second parameter is ProductID and the value for the second parameter is 5, the actions returned may include a drillthrough report to customer Joe, a drillthrough report to product 5, a hyperlink to send an email to customer Joe, and a drillthrough report showing the details of transactions where customer Joe bought product 5. Upon selecting the action, the report control 220 would then execute the selected action.

In this manner, when an item, which has been associated with a dynamic action, is selected by the user, the report control 200 makes a call to the dynamic actions extension 250, which then determines the set of actions that may be performed for that particular item. As such, the set of actions are dynamically determined, i.e., they are determined at run time, as opposed to being determined at the time the report is defined. In one implementation, in the case of the winforms control, the set of dynamic actions instructions may include metadata in the rendering stream. In another implementation, in the case of the webforms control, the set of dynamic actions instructions may include script and calls to the script in the hypertext markup language (HTML) when the item is selected.

In one implementation, the set of action instructions may be configured to deliver multiple parameters and their values when a single item is selected. For instance, if the report has a customer first name column and a customer last name column. The set of action instructions may be configured such that when either the customer first name or the customer last name is selected, both parameters are sent to the dynamic actions extension 250. When a customer first name having the value of Joe is selected, the report control 220 would send both the customer first name parameter having the value of Joe and its corresponding last name parameter having the value of Smith. If a set of matching actions exist for the parameter set, then the dynamic actions extension 250 would send a list of possible actions to the report control 220. For instance, the dynamic actions extension 250 may send an action that is configured to execute the customer detail report of a customer having the first name equal Joe and the last name equal Smith. The dynamic actions extension 250 may also send another action configured to find all meetings with a person having the first name Joe and the last name Smith.

As previously mentioned, the dynamic actions extension 250 may be in communication with the external action source 280. In one implementation, upon receipt of a certain parameter from the report control 220, the dynamic actions extension 250 may be configured to retrieve a list of actions that may be performed on that item from the external action source 280. Upon receipt of the list of actions, the dynamic actions extension 250 would simply forward the list to the report control 220. As an example, the external action source 280 may be MicrosoftE Office XP Smart Tag Manager.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer storage medium having computer-executable instructions which, when executed by a computer, cause the computer to:
   generate a report according to a definition from a report catalog, wherein the definition is a template for the report defining what data will be displayed and a format of the data;
   identify a plurality of parameters associated with a selected item on the report and a plurality of values that correspond to the parameters;
   send the plurality of parameters and plurality of values to a dynamic actions extension, wherein the dynamic actions extension is configured to:
      dynamically determine one or more actions that may be performed on the selected item based on the plurality of parameters and the plurality of values;
      retrieve a list of the one or more actions from an external action source; and
      send the list of the one or more actions to the report control, wherein the one or more actions comprise one or more hyperlink actions, one or more bookmark actions or combinations thereof;
   receive the list of the one or more actions from the dynamic actions extension; and display the list of the one or more actions.

2. The computer storage medium of claim 1, wherein the action is determined based on semantic knowledge of the report.

3. The computer storage medium of claim 1, wherein the action comprises a drillthrough report comprising one or more details of one or more transactions.

4. The computer storage medium of claim 1, wherein the format is Extensible Markup Language, bitmap, printer, Tagged Image File Format, PostScript, Printer Command Language, Portable Document Format, or Joint Photographic Experts Group.

5. A computer system, comprising:
   a processor; and
   a report control comprising program instructions executable by the processor to:
      generate a report according to a definition from a report catalog, wherein the definition is a template for the report defining what data will be displayed and a format of the data;
      identify a plurality of parameters associated with a selected item on the report and a plurality of values that correspond to the parameters;
      send the plurality of parameters and plurality of values to a dynamic actions extension, wherein the dynamic actions extension is configured to:
         dynamically determine one or more actions that may be performed on the selected item based on the plurality of parameters and the plurality of values;
         retrieve a list of the one or more actions from an external action source; and
         send the list of the one or more actions to the report control, wherein the one or more actions comprise one or more hyperlink actions, one or more bookmark actions or combinations thereof;
      receive the list of the one or more actions from the dynamic actions extension; and
      display the list of the one or more actions.

6. The computer system of claim 5, wherein the one or more actions are determined based on semantic knowledge of the report.

7. The computer system of claim 5, wherein the one or more actions further comprise drillthrough report actions.

8. A memory for storing data for access by an application program being executed on a processor, the memory comprising:
   a data structure stored in the memory, the data structure comprising:
      a report defined according to a definition from a report catalog, wherein the definition is a template for the report defining what data will be displayed and a format of the data;
      a set of instructions for a report control, the set of instructions being configured to cause the report control to:
         identify a plurality of parameters associated with a selected item on the report and a plurality of values that correspond to the parameters;
         send the plurality of parameters and plurality of values to a dynamic actions extension, wherein the dynamic actions extension is configured to:
            dynamically determine one or more actions that may be performed on the selected item based on the plurality of parameters and the plurality of values;

retrieve a list of the one or more actions from an external action source; and send the list of the one or more actions to the report control, wherein the one or more actions comprise one or more hyperlink actions, one or more bookmark actions or combinations thereof;

receive the list of the one or more actions from the dynamic actions extension; and display the list of the one or more actions.

9. The memory of claim 8, wherein the set of instructions comprises metadata in a rendering stream.

10. The memory of claim 8, wherein the set of instructions comprises script and calls to the script in a hypertext markup language (HTML).

11. The memory of claim 8, wherein the set of instructions is configured to cause the report control to communicate with a report server to request the one or more actions that are performable on the selected item.

12. The memory of claim 8, wherein the one or more actions comprise sending an email.

* * * * *